US006615583B2

(12) United States Patent
Yanagimoto

(10) Patent No.: US 6,615,583 B2
(45) Date of Patent: Sep. 9, 2003

(54) PRESSURIZING APPARATUS

(75) Inventor: Osamu Yanagimoto, Kobe (JP)

(73) Assignee: Falcom Co., LTD, Kobe (JP)

( * ) Notice: Subject to any disclaimer, the term of this patent is extended or adjusted under 35 U.S.C. 154(b) by 0 days.

(21) Appl. No.: 09/936,423

(22) PCT Filed: Feb. 21, 2001

(86) PCT No.: PCT/JP01/01265

§ 371 (c)(1), (2), (4) Date: Dec. 4, 2001

(87) PCT Pub. No.: WO02/055291

PCT Pub. Date: Jul. 8, 2002

(65) Prior Publication Data

US 2003/0094106 A1 May 22, 2003

(30) Foreign Application Priority Data

Jan. 16, 2001 (JP) .......................................... 2001-8187

(51) Int. Cl.[7] ................................................ B60T 17/00
(52) U.S. Cl. ........................................................ 60/565
(58) Field of Search ........................................... 60/565

(56) References Cited

U.S. PATENT DOCUMENTS 4,300,351 A * 11/1981 Grullmeier .................... 60/565
4,787,206 A * 11/1988 Fabrowsky .................. 60/565
5,345,766 A * 9/1994 Leonhartsberger et al. ... 60/565

FOREIGN PATENT DOCUMENTS

JP 2000-141092 5/2000

* cited by examiner

*Primary Examiner*—Edward K. Look
*Assistant Examiner*—Michael Leslie
(74) *Attorney, Agent, or Firm*—Oblon, Spivak, McClelland, Maier & Neustadt, P.C.

(57) ABSTRACT

A pressurizing apparatus includes a fixed portion, an input shaft acting directly in an axial direction with respect to the fixed portion, an output shaft extending coaxially with the input shaft to slide with respect to the fixed portion and the input shaft, a direct-connecting mechanism directly connecting the output shaft and the input shaft and causing the input shaft to directly act with respect to the fixed portion to thereby rapidly carry the output shaft with respect to the fixed portion, a fluid pressure mechanism connecting the input shaft and the output shaft in a fluid manner and causing the input shaft to directly act with respect to the output shaft to thereby increase biasing of the input shaft by Pascal's law and transmit the biasing to the output shaft, and a control mechanism actuated by biasing applied by the input shaft to control fluid connection of the input shaft and the output shaft to each other. The control mechanism is directly actuated by biasing of the input shaft applied by the input shaft. Therefore, the apparatus need not include a special actuator for driving the control mechanism and can be formed with a simple structure and at low cost.

12 Claims, 7 Drawing Sheets

PRESSURIZING APPARATUS

TECHNICAL FIELD

The present invention relates to a pressurizing apparatus used for pressurization of a metal mold in sheet-metal presswork and clamping of a metal mold in die casting and injection molding.

BACKGROUND ART

As a mechanism for applying thrust to a metal mold so as to carry out pressurization of the metal mold in sheet-metal presswork and the like and clamping of the metal mold in die casting and injection molding, there are mainly the following two mechanisms. One is a motor-driven pressurizing mechanism in which a rotational motion of a motor is converted into a linear motion by a mechanism such as a screw feeding mechanism for converting a rotational motion into a linear motion and an output shaft is moved forward and rearward by the linear motion. The other is a hydraulic pressurizing mechanism in which a hydraulic pump is actuated by a rotational driving force of a motor to cause a hydraulic cylinder to directly act by oil discharged from the hydraulic pump to move an output shaft connected to the hydraulic cylinder forward and rearward.

By using any of the above mechanisms, however, it is difficult to obtain both high-speed movement and high thrust because a motor capacity is limited to a small value due to circumstances such as manufacturing cost. In other words, a carrying speed has to be reduced by reducing a speed reducing ratio of a powertrain or the like so as to obtain high-speed movement while thrust has to be reduced by increasing the speed reducing ratio of the powertrain or the like so as to obtain high thrust.

Therefore, an object of the present invention relates to a pressurizing apparatus used for pressurization of a metal mold in sheet-metal presswork and the like and clamping of a metal mold in die casting, injection molding, and the like and is to provide a low-cost pressurizing apparatus with high productivity by combining a direct-connecting mechanism for moving an output shaft with low thrust and at a high speed and a fluid pressure mechanism for driving the output shaft at a low speed and with high thrust with each other.

DISCLOSURE OF THE INVENTION

An invention described in claim 1 is formed of a pressurizing apparatus including a fixed portion, an input shaft for acting directly in an axial direction with respect to the fixed portion, an output shaft extending coaxially with the input shaft to slide with respect to the fixed portion and the input shaft, a direct-connecting mechanism for directly connecting the output shaft and the input shaft and for causing the input shaft to directly act with respect to the fixed portion to thereby rapidly carry the output shaft with respect to the fixed portion, a fluid pressure mechanism for connecting the input shaft and the output shaft in a fluid manner and for causing the input shaft to directly act with respect to the output shaft to thereby increase biasing of the input shaft by Pascal's law and transmit the biasing to the output shaft, and a control mechanism actuated by biasing applied by the input shaft to control fluid connection of the input shaft and the output shaft to each other.

The pressurizing apparatus according to the invention described in claim 1 operates as follows in a step such as pressurization of a metal mold in sheet-metal presswork and clamping of a metal mold in injection molding. The present apparatus directly connects the output shaft to the input shaft to rapidly carry the output shaft in a reciprocating stroke excluding a vicinity of a turning point between going and returning of the metal mold. By this rapid carrying, it is possible to move the metal mold with the output shaft at a high speed. The present apparatus cancels direct connection and causes the input shaft to directly act with respect to the output shaft at points of a stroke in the vicinity of the turning point. Thus, the control mechanism is actuated to connect the input shaft and the output shaft to each other in a fluid manner. By this fluid connection, biasing by the input shaft can be increased by Pascal's law and transmitted to the metal mold through the output shaft.

As a result, according to the present invention, it is possible to provide the pressurizing apparatus by which both high-speed movement of the metal mold and pressurization of the metal mold with high thrust can be obtained even if an inexpensive low-capacity motor (drive source) is used. Because it is possible to shorten processing time by moving the metal mold at a high speed, productivity is increased.

In the invention, the control mechanism for controlling fluid connection of the input shaft and the output shaft to each other is directly actuated by biasing of the input shaft applied by the input shaft. Therefore, the apparatus according to the invention does not need to have a special actuator for driving the control mechanism and can be formed with a simple structure at low cost.

An invention described in claim 2 is formed of a pressurizing apparatus according to claim 1 in which the input shaft is caused to act directly by a servomotor in the axial direction with respect to the fixed portion through a rotation/direct-action converting mechanism.

According to the invention described in claim 2, in addition to advantages of the invention described in claim 1, there are the following advantages. In other words, because the servomotor has great general versatility and it is possible to easily control switching between normal and reverse rotations, timing of switching, a rotation speed, and the like of the servomotor, it is possible to swiftly change processing conditions such as a direct-acting stroke of the output shaft and a pressurizing force without using a complicated apparatus.

An invention described in claim 3 is formed of a pressurizing apparatus according to claim 2 in which the rotation/direct-action converting mechanism is a ball screw-nut mechanism and has a ball screw supported for rotation by the fixed portion and a nut fixed to the input shaft.

According to the invention described in claim 3, in addition to advantages of the invention described in claim 2, there are the following advantages. Because the ball screw can be rotated smoothly at a high speed, it is possible to further shorten the processing time and to maintain a long life of the servomotor.

An invention described in claim 4 is formed of a pressurizing apparatus according to claims 1 to 3 in which the fluid pressure mechanism includes a first fluid chamber biased by the input shaft by causing the input shaft to directly act with respect to the output shaft and a second fluid chamber having a larger pressurizing area than the first fluid chamber to bias the output shaft and the control mechanism opens a first fluid path between the first fluid chamber and the second fluid chamber to connect the input shaft and the output shaft in a fluid manner.

According to the invention described in claim 4, in addition to advantages of the inventions described in claims 1 to 3, there are the following advantages. Because the fluid connection of the input shaft and the output shaft to each other can be carried out by only opening the first flow path by the control mechanism, it is possible to form the apparatus simply.

An invention described in claim 5 is formed of a pressurizing apparatus according to claim 4 in which the control mechanism includes a separating mechanism disposed in the first fluid path to separate the first fluid path and to cancel the separation by pressure in the first fluid chamber increased by biasing applied by the input shaft.

According to the invention described in claim 5, in addition to advantages of the invention described in claim 4, there are the following advantages. The direct-connection of the output shaft and the input shaft to each other is canceled at points of the stroke in the vicinity of the turning point between going arid returning of the metal mold and the pressure in the first fluid chamber is increased by relative sliding of both the shafts. Because the separating mechanism is actuated by this increase in pressure to open the first fluid path, it is possible to automatically shift to transmission of thrust from the input shaft to the output shaft by the fluid pressure mechanism.

An invention described in claim 6 is formed of a pressurizing apparatus according to claim 4 or 5 in which the second fluid chamber has a second fluid path communicating with a third fluid chamber provided separately from the first fluid chamber and the second fluid path is open while rapid carrying by the direct-connecting mechanism is carried out and is closed by a closing mechanism actuated by the pressure of the first fluid chamber increased by the biasing by the input shaft after direct connection by the direct-connecting mechanism is cancelled.

According to the invention described in claim 6, in addition to advantages of the invention described in claim 4 or 5, there are the following advantages. A capacity of the second fluid chamber is rapidly changed by biasing of the output shaft itself in rapid movement of the output shaft by rapid carrying. Therefore, the second fluid path through which fluid in the second fluid chamber flows in and out according to the change of the capacity is provided and connected to the third fluid chamber and the second fluid path is closed after the rapid carrying is completed to automatically shift to transmission of thrust from the input shaft to the output shaft by the fluid pressure mechanism.

An invention described in claim 7 is formed of a pressurizing apparatus according to claim 6 further including a closing mechanism for closing the second fluid path at pressure lower than pressure at which the separation by the separating mechanism is cancelled.

According to the invention described in claim 7, in addition to advantages of the invention described in claim 6, there are the following advantages. After the rapid carrying is completed, the first fluid path is opened following closing of the second fluid path and switching of operation from the rapid carrying to high-thrust pressurization is carried out automatically. Therefore, it is unnecessary to especially provide means for synchronizing operations of the direct-connecting mechanism and control mechanism and it is possible to obtain the present pressurizing apparatus at low cost and with a simple structure.

An invention described in claim 8 is formed of a pressurizing apparatus according to claim 7 in which magnets for retaining a separating member in respective positions corresponding to a separating state and a separation canceling state of the first fluid path are disposed in the control mechanism in the separating mechanism.

The invention described in claim 8 has the following advantages in addition to advantages of the invention described in claim 7. In other words, without newly providing a pressure sensor and an actuator, it is possible to maintain the separating mechanism in the separating state until internal pressure of the first fluid chamber increases to pressure at which the closing mechanism is actuated. It is also possible to maintain the separating mechanism in the separation canceling state if a pressure difference between the first fluid chamber and the second fluid chamber disappears after the separation by the separating mechanism is cancelled temporarily. Thus, it is possible to keep the first fluid path open and rearward movement of the output shaft by the fluid pressure mechanism is carried out smoothly. Therefore, it is possible to obtain the pressurizing apparatus according to the invention at low cost and with a simple structure. There is not especially a fear of trouble.

An invention described in claim 9 is formed of a pressurizing mechanism according to claims 1 to 8 in which the direct-connecting mechanism is formed by disposing an engaging member in one of the input shaft and the output shaft and disposing an engaged member in the other, direct connection of the input shaft and the output shaft to each other by the engaging member and the engaged member is maintained by biasing of the output shaft by the input shaft, and the direct connection of the input shaft and the output shaft to each other is cancelled when the biasing of the output shaft by the input shaft is attenuated.

The invention described in claim 9 has the following advantages in addition to advantages of the inventions described in claims 1 to 8. Because direct-connection of the input shaft and the output shaft to each other is maintained and cancelled by controlling biasing of the output shaft by the input shaft in the direct-connecting mechanism, is it unnecessary to provide a special actuator for driving the direct-connecting mechanism and sensors and the like and it is possible to form the apparatus at low cost and with a simple structure.

An invention described in claim 10 is formed of a pressurizing apparatus according to any one of claims 4 to 9 in which the first fluid chamber is defined by an outer peripheral portion of the input shaft, a first piston provided to the outer peripheral portion, and a first cylinder formed inside the output shaft, the second fluid chamber and the third fluid chamber are defied by an outer peripheral portion of the output shaft, a second piston provided to an axial intermediate portion of the outer peripheral portion, and a second cylinder formed inside the fixed portion and are disposed on opposite sides of the second piston in an axial direction of the output shaft.

The invention described in claim 10 has the following advantages in addition to advantages of the inventions described in claims 4 to 9. In other words, because the pressurizing apparatus according to the invention has a simple structure formed by inserting the input shaft into the output shaft formed in a tubular shape and inserting the output shaft into the fixed portion, it is possible to easily assemble the apparatus. By arranging the second fluid chamber and the third fluid chamber in the axial direction inside the second cylinder, it is possible to simply form the entire apparatus in a small size.

An invention described in claim 11 is formed of a pressurizing apparatus according to claim 10 in which the third fluid chamber has a sub-piston moved by biasing by the output shaft to absorb the biasing of the output shaft.

The invention described in claim 11 has the following advantages in addition to advantages of the invention described in claim 10. In other words, because the third fluid chamber has the sub-piston for absorbing biasing of the third fluid chamber by the output shaft, pressurization by the output shaft can be carried out without hindrance.

An invention described in claim 12 is formed of a pressurizing apparatus according to claim 10 or 11 in which the first fluid path is formed of a passage hole formed in the output shaft and connecting an outer peripheral side and an inner side of the output shaft and the second fluid path is formed of a passage hole formed in the second piston and connecting axial opposite outer faces of the second piston.

The invention described in claim 12 has the following advantages in addition to advantages of the invention described in claim 10 or 11. Because the connecting holes forming the respective fluid paths are formed as partitioning members for the respective fluid chambers, the structure is simple and can be processed easily. As compared with a case of disposing a pipe and the like outside the apparatus, resistance of fluid is smaller and there is no fear of leakage of fluid to an outside.

THE BEST MODE FOR CARRYING OUT THE INVENTION

Figure 1:
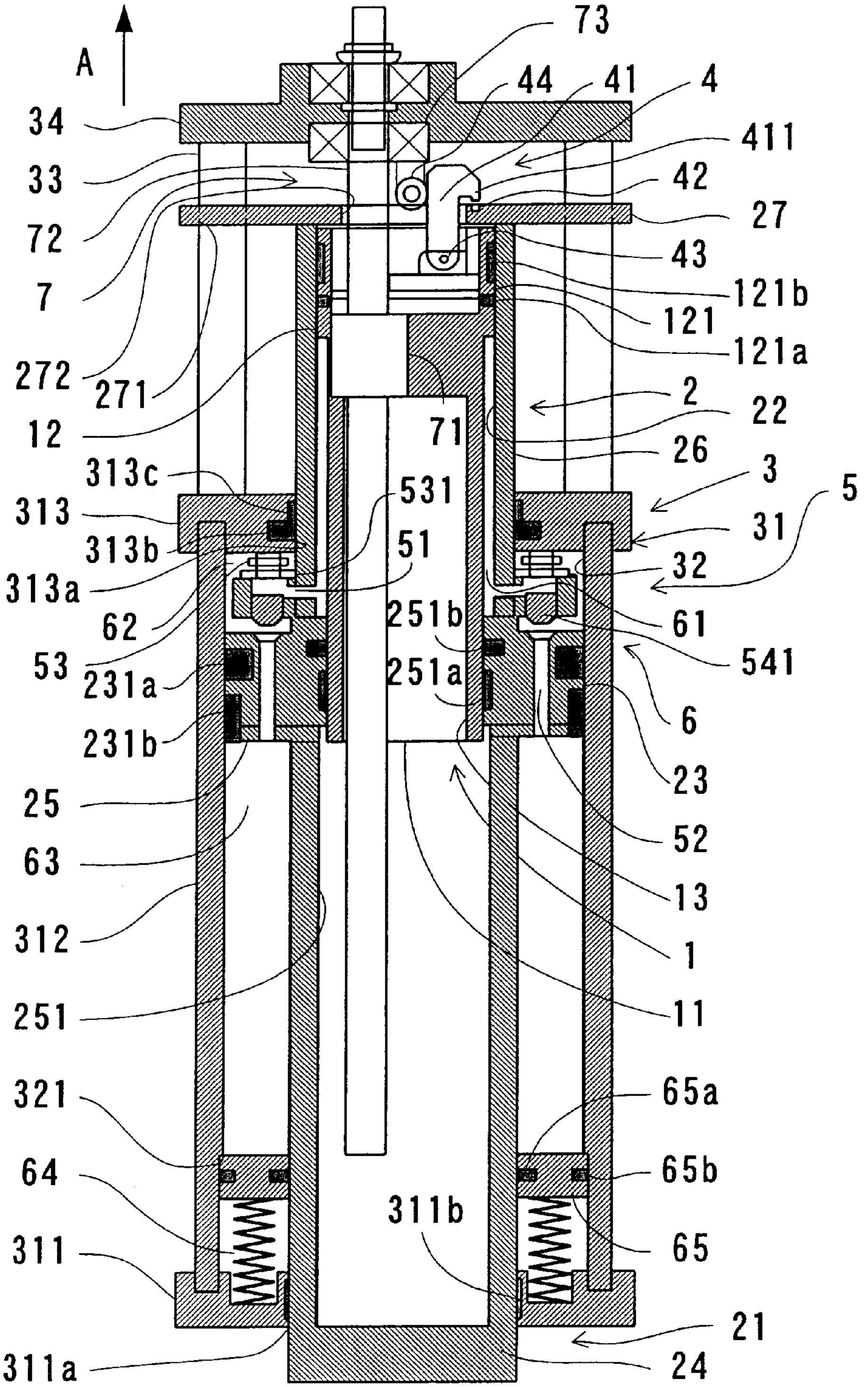
FIG. 1 is a side portion sectional view of a pressurizing apparatus according to the present invention and showing an initial state before an output shaft starts high-speed movement.

The preferred embodiment of the present invention will be described below by reference to the drawings.

Although a direction of an arrow A in the drawings is described as an upward direction of the pressurizing apparatus according to the invention, this direction is defined for convenience in description and does not limit a disposition attitude of the apparatus. The pressurizing apparatus according to the invention may be disposed in an orientation different from that in the description, e.g., sideways.

Figure 2:
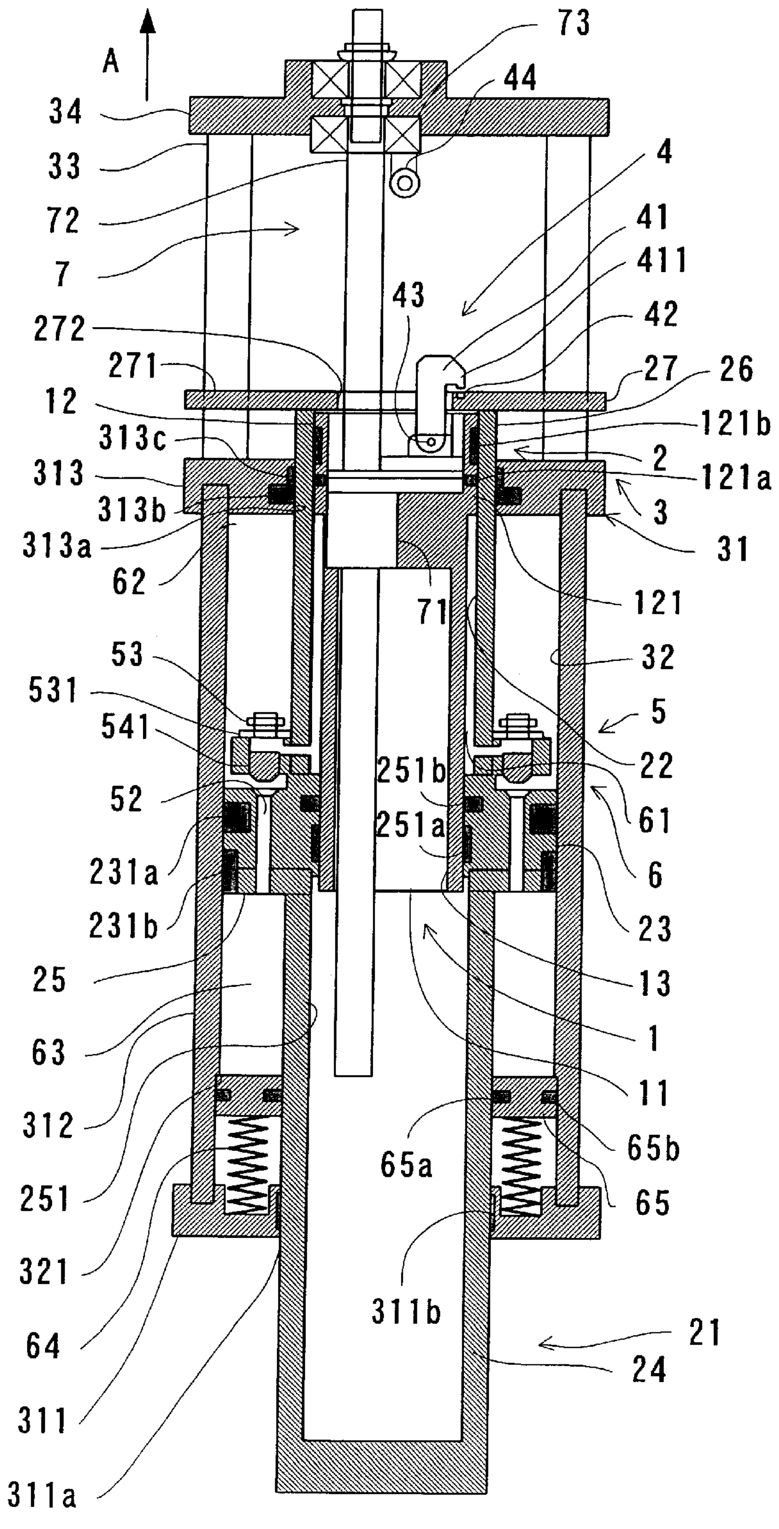
FIG. 2 is a side portion sectional view of the pressurizing apparatus according to the invention and showing a state in which the high-speed movement of the output shaft by connection of the output shaft to an input shaft is completed.
Figure 3:
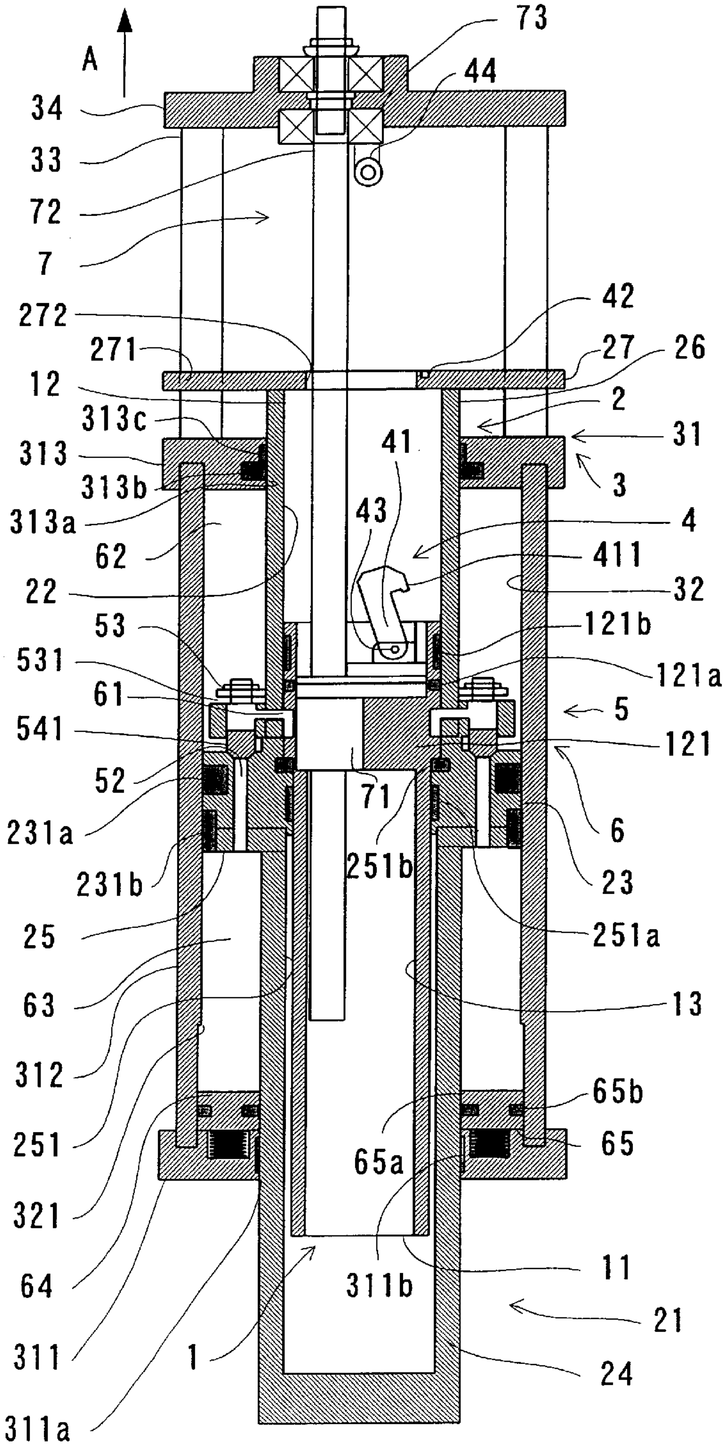
FIG. 3 is a side portion sectional view of the pressurizing apparatus according to the invention and showing a state in which the output shaft is separated from the input shaft and pressurized by a hydraulic mechanism.
Figure 4:
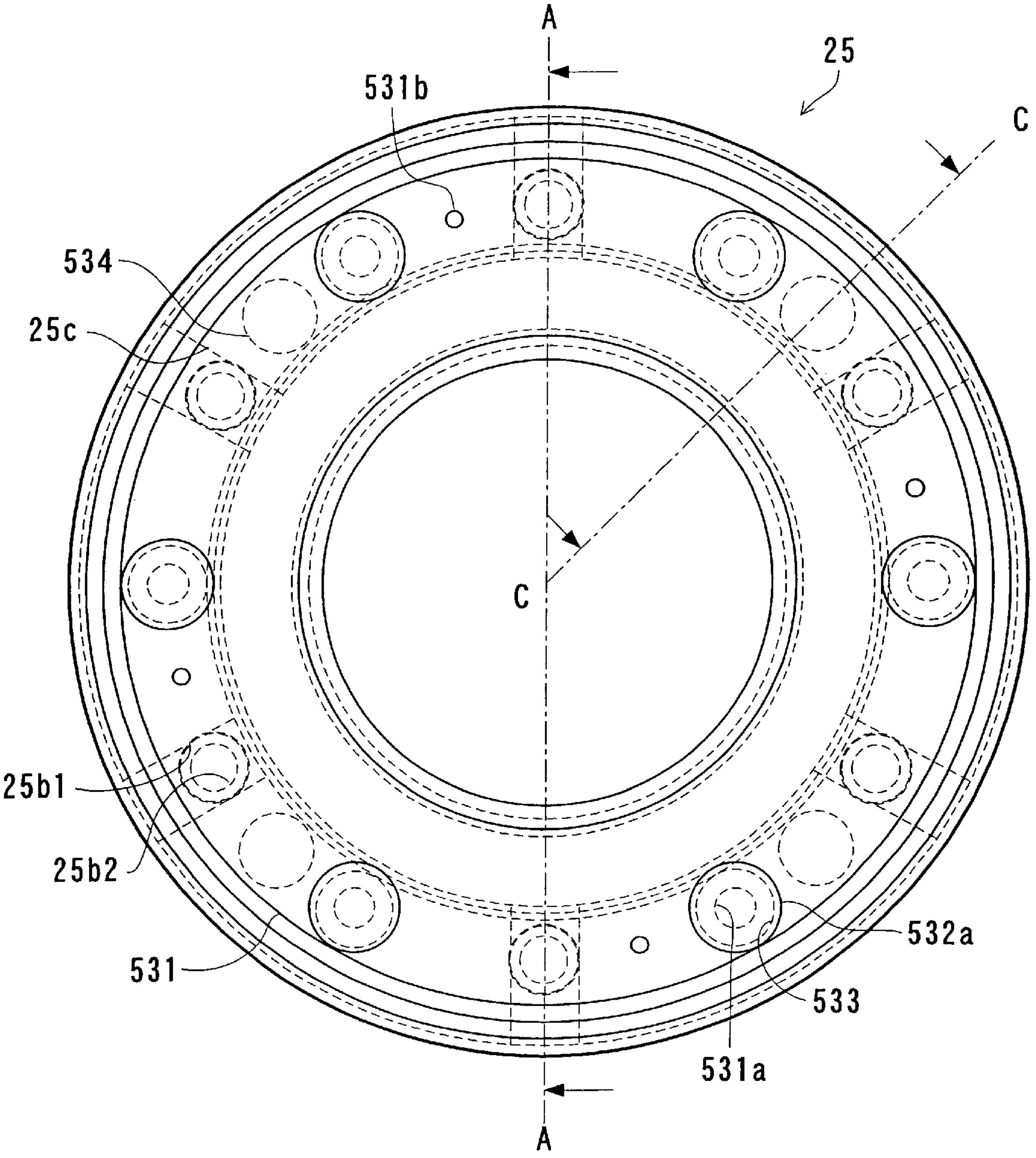
FIG. 4 is a front view of a control mechanism of the pressurizing apparatus according to the invention.
Figure 5:
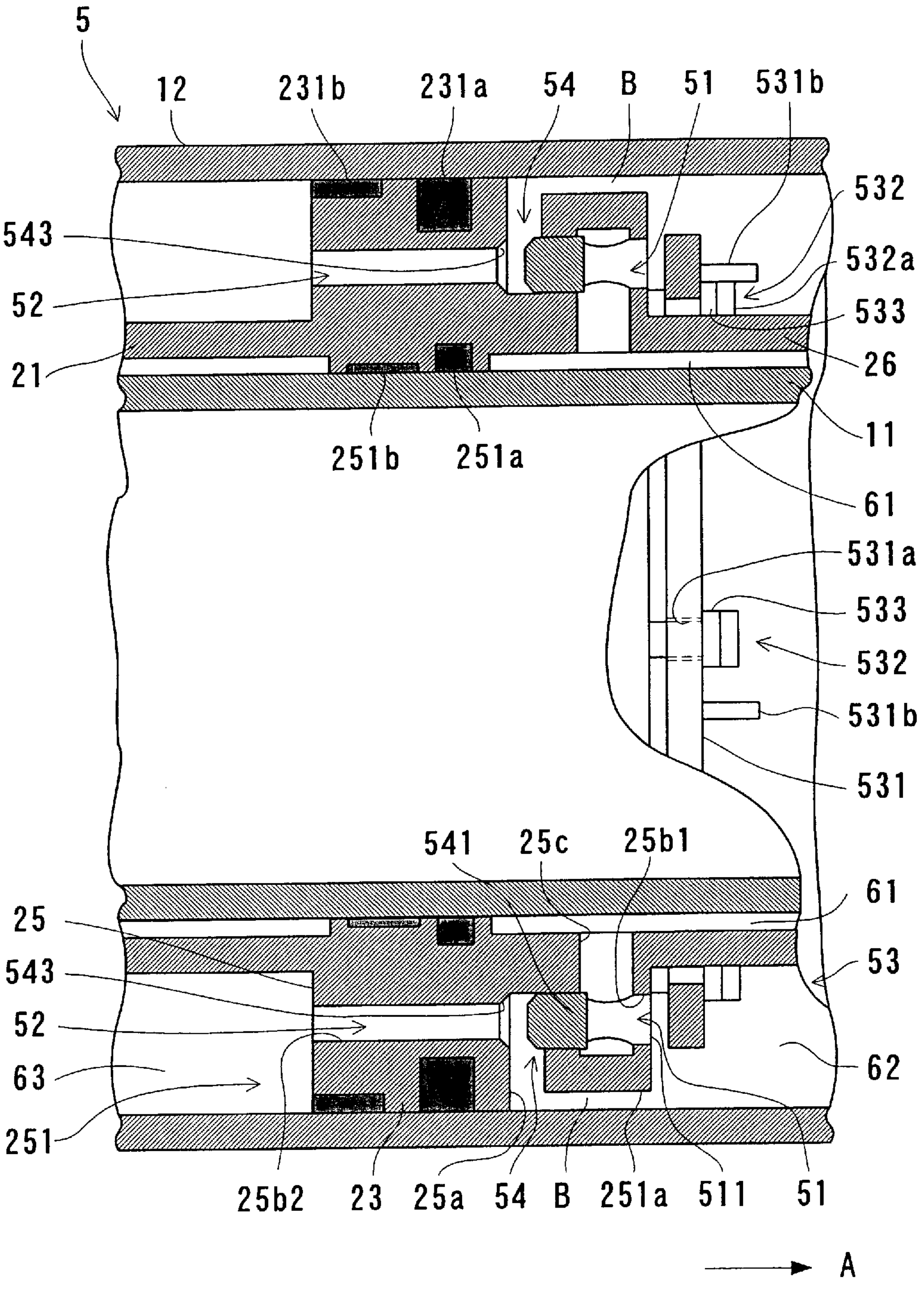
FIG. 5 is a sectional view taken along a line A—A in FIG. 4 and showing a section and peripheral portions of the control mechanism.
Figure 6:
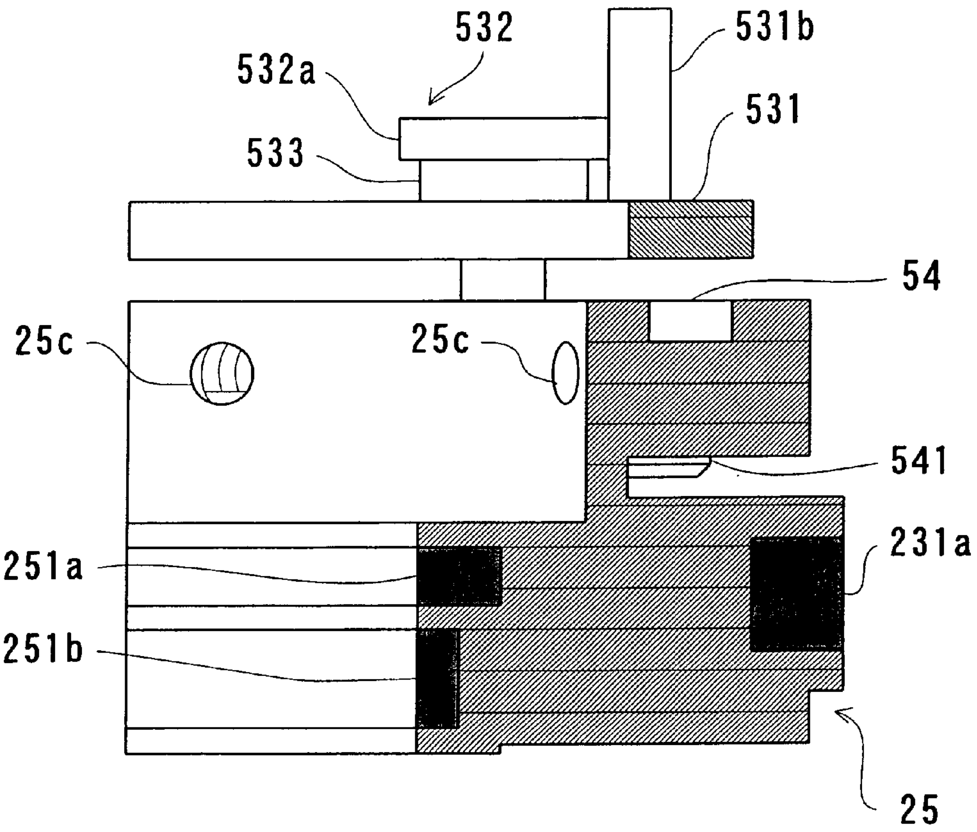
FIG. 6 is a sectional view taken along a line C—C in FIG. 4.

First, a general outline of the pressurizing apparatus according to the embodiment will be described. In FIGS. 1 to 3, a reference numeral 1 designates an input shaft, 2 an output shaft, 3 a fixed portion, 4 a direct-connecting mechanism, 5 a control mechanism, and 6 a hydraulic mechanism (fluid pressure mechanism).

An input shaft 1 is formed to be able to directly act in an axial direction of the input shaft 1 with respect to the fixed portion 3 by driving of a drive source. The input shaft 1 directly acts while being directly connected to the output shaft 2 by the direct-connecting mechanism 4 to rapidly carry the output shaft 2 with respect to the fixed portion 3. When thrust of the input shaft 1 biases the output shaft 2, the direct-connecting mechanism 4 maintains a direct-connected state due to the biasing. When the biasing disappears, the direct-connected state is cancelled. Therefore, if the input shaft 1 is stopped, the direct connection of the input shaft 1 and the output shaft 2 to each other is cancelled.

If the input shaft 1 acts directly in a state in which the direct connection of the input shaft 1 and the output shaft 2 to each other is cancelled, the control mechanism 5 is actuated by biasing by the input shaft 1. The control mechanism 5 connects the input shaft 1 and the output shaft 2 in a fluid manner through oil by the hydraulic mechanism 6 disposed midway between the input shaft 1 and the output shaft 2. By sliding the input shaft 1 with respect to the output shaft 2, the hydraulic mechanism 6 increases the thrust of the input shaft 1 by Pascal's law and transmits the thrust to the output shaft 2 and the output shaft 2 is pressurized with high thrust. As a result, both high-speed movement and high-thrust pressurization of the output shaft 2 can be obtained and productivity can be improved.

In the invention, because the direct-connecting mechanism 4 and the control mechanism 5 are actuated by only the thrust of the input shaft 1, switching between the high-speed movement and the high-thrust pressurization can be carried out by only controlling the thrust of the input shaft 1, i.e., a drive source of the input shaft 1. Therefore, it is unnecessary to especially provide a special actuator for switching, a device for controlling the actuator, and the like and the pressurizing apparatus according to the invention is advantageous in that the apparatus can be produced to be compact and at low cost.

Next, details of a structure of the pressurizing apparatus according to the embodiment will be described.

The input shaft 1 is formed to include a pillar-shaped input shaft main body 11 extending vertically and a first piston 12 added in a step shape onto an outer peripheral side face of the input shaft main body 11. More specifically, the input shaft main body 11 is formed into a circular-cylindrical shape, a first piston 12 is formed as a circular ring-shaped step portion concentric with the input shaft main body 11 throughout a periphery of the side face of an upper portion of the input shaft main body 11. The input shaft main body 11 is formed into the circular-cylindrical shape and the first piston 11 is formed into the circular ring shape in order to simplify the structure and to facilitate manufacturing and processing. Sliding portions of the output shaft and the fixed portion are also formed to have circular sectional shapes for the same reason.

The input shaft main body 11 is formed with a cap hole 13 extending upward from a bottom face of the input shaft main body 11 and a nut 71 which is a direct-acting body is fixed into a hole formed in a solid portion at an upper portion of the cap hole 13 through a keyway. The nut 71 is combined with a ball screw 72 as a vertically extending rotating body to form a ball screw-nut mechanism 7 as a rotation/direct-action converting mechanism together with the ball screw 72. Bearings 73, 73 are disposed on an upper end side of the ball screw 72 and an upper plate 34 of the fixed portion 3 is sandwiched between the bearings 73, 73 from above and below. Thus, an upper side of the ball screw 72 is supported for rotation with respect to the fixed portion 3 and a lower side of the ball screw 72 is supported by the nut 71 fixed to the solid portion of the input shaft 1. A tip end portion of the ball screw 72 projecting downward from the nut 71 is inserted into the cap hole 13. The ball screw 72 is rotated by a servomotor (not shown) as a rotation drive source fixed on a fixed portion 3 side through a transmission gear such as a belt disposed on an upper end side of the ball screw 72. The nut 71 directly acts on the ball screw 72 in response to rotation of the ball screw 72. In other words, by rotating the ball screw 72, the input shaft 1 directly acts in a vertical direction, i.e., an axial direction.

Because an outer periphery of the input shaft 1 is formed into a circular shape, the input shaft 1 rotates relatively to the output shaft 2 when a rotating force is applied to the input shaft 1. In order to prevent this relative rotation, the nut 71 and the ball screw 72 are fixed to positions offset from an axial center of the input shaft 1.

Although the ball screw-nut mechanism 7 is employed as the rotation/direct-action converting mechanism in the embodiment because importance is placed on high-speed and smooth direct acting of the input shaft 1 and reliability of actuation, it is also possible to employ other combinations such as a rack-and-pinion mechanism and a rotating crank-shaft mechanism as a mechanism for converting a rotational motion into a linear motion.

The output shaft 2 is formed to have a tubular output shaft main body 21 in which the input shaft 1 is housed for sliding with respect to the output shaft main body 21, a first cylinder 22 formed on an inner peripheral side face of the output shaft main body 21 to cooperate with the first piston, and a second piston 23 added in a step shape onto an outer peripheral side face of the input shaft main body 21.

More specifically, the output shaft 2 is formed as follows. The output shaft main body 21 includes an output shaft tip end portion 24 in a shape of a closed-end cylinder, a cylindrical valve body 25 connected and fixed to an upper portion of the output shaft tip end portion 24, and a cylindrical first cylinder tube 26 connected and fixed to an upper portion of the valve body 25. The output shaft main body 21 is formed in a cylindrical shape extending coaxially with the input shaft 1 as a whole. To the upper portion of the output shaft main body 21, a guide plate 27 for guiding sliding of the output shaft 2 and the fixed portion 3 with respect to each other and for preventing rotation of the output shaft 2 and the fixed portion 3 with respect to each other is fixed. The guide plate 27 has at a peripheral edge portion thereof a plurality of guide holes 271 to be engaged with guide rods 33 provided to an upper face of a fixed portion main body 31 and has in the vicinity of a central portion of the guide plate 27 a rather large guide plate center hole 272 through which the ball screw 72 is inserted.

An inside diameter of the valve body 25 is set to be slightly larger than an outside diameter of the input shaft main body 11. At an inner peripheral portion 251 of the valve body 25, a ring-shaped sealant 251*a* and a skid 251*b* are disposed. The input shaft main body 11 and the valve body 25 can slide with respect to each other in a watertight manner due to the sealant 251*a*. The skid 251*b* is a spacer for preventing damage and the like due to direct contact of the outer peripheral portion of the input shaft main body 11 and the inner peripheral portion 251 of the valve body 25 with each other. Other skids which will be described later are also spacers for preventing direct contact of the members with each other, the members sliding with respect to each other.

The first cylinder 22 is formed on an inner peripheral face of the first cylinder tube 26. An inside diameter of the first cylinder 22 is set to be slightly larger than an outside diameter of the first piston 12. A ring-shaped sealant 121*a* and a skid 121*b* are disposed at an outer peripheral portion of the first piston 12 and the first cylinder 22 can slide with respect to the first piston 12 in a watertight manner due to the sealant 121*a*.

Between the input shaft 1 and the output shaft 2, a first oil chamber (first fluid chamber) 61 defined by the outer peripheral side face of the input shaft main body 11 and an inner peripheral face of the first cylinder 22 and pressurized by the first piston 12 is formed. As a result, the first oil chamber 1 is biased by the input shaft 1.

An inside diameter of the output shaft tip end portion 24 is set to be sufficiently larger than the outside diameter of the input shaft main body 11 such that the input shaft main body 11 can move vertically and relatively without resistance while being inserted into the output shaft tip end portion 24.

Thus, the input shaft 1 and the output shaft 2 can slide with respect to each other. An outside diameter of the valve body 25 is set to be larger than outside diameters of the output shaft tip end portion 24 and the first cylinder tube 26. Thus, the valve body 25 forms step portions between the output shaft tip end portion 24 arid the first cylinder tube 26, i.e., the circular ring-shaped second piston 23 added in the step shape to the outer peripheral side face of the output shaft main body 21. In order to apply high thrust to the output shaft 2, a pressurizing area S2 of the second piston 23 (step) is set to be sufficiently larger than a pressurizing area S1 (step) of the first piston 12.

The fixed portion 3 includes the tubular fixed portion main body 31 through which the output shaft 2 is inserted for relative sliding and the second cylinder 32 formed on an inner peripheral side face of the fixed portion main body 31 to cooperate with the second piston.

The fixed portion main body 31 is formed to have a base plate 311 having a circular through hole 311*a*, a cylindrical second cylinder tube 312 connected and fixed to an upper portion of the base plate 311, and an intermediate plate 313 connected and fixed to an upper portion of the second cylinder tube 312 and having a circular through hole 313*a*. Axial centers of the through holes 311*a* and 313*a* and the second cylinder tube 312 are aligned with each other and the fixed portion main body 31 is formed into a cylindrical shape as a whole.

To an upper face of the intermediate plate 313, one ends of the plurality of guide rods 33 inserted through the guide holes 271 in the guide plate 27 are secured. The guide rods 33 extend upward and the other ends of the guide rods 33 are connected to the upper plate 34. The upper plate 34 supports the upper end of the ball screw 72 for rotation as described above.

An inside diameter of the through hole 311*a* in the base plate 311 is set to be slightly larger than the outside diameter of the output shaft tip end portion 24. At an inner peripheral portion of the through hole 311*a*, a ring-shaped skid 311*b* is disposed such that the output shaft main body 21 can smoothly slide through the through hole 311*a* without rattling. On an upper face side of the base plate 311, a ring-shaped sub-piston 65 is disposed through an auxiliary spring 64. The sub-piston 65 has at inner and outer peripheral portions thereof ring-shaped sealants 65*a* and 65*b* to slide in a watertight manner with respect to the output shaft main body 21 and the second cylinder 32. Thus, oil leakage from a third oil chamber 63 which will be described later to an outside is prevented.

An inside diameter of the second cylinder tube 312, i.e., an inside diameter of the second cylinder 32 is set to be slightly larger than an outside diameter of the second piston 23. A ring-shaped sealant 231*a* and a skid 231*b* are disposed at an outer peripheral portion of the second piston 23 and the second piston 23 and the second cylinder 32 can slide with respect to each other in a watertight manner due to the sealant 231*a*.

An inside diameter of the through hole 313*a* in the intermediate plate 313 is set to be slightly larger than an outside diameter of the first cylinder tube 26. A ring-shaped sealant 313*b* and a skid 313*c* are disposed at an inner peripheral portion of the through hole 313*a* and the first cylinder tube 26 and the intermediate plate 313 can slide with respect to each other in a watertight manner due to the sealant 313*b*.

Between the output shaft 2 and the fixed portion 3, a second oil chamber (second fluid chamber) 62 and the third oil chamber (third fluid chamber) 63 defined by an outer peripheral side face of the output shaft 1 and an inner peripheral face of the second cylinder 22 are formed. The second oil chamber 62 is formed on an upper side of the second piston 23 and the third oil chamber 63 is formed on a lower side through the second piston 23.

The second oil chamber 62 transmits biasing applied to the first oil chamber 61 by the first piston 12 to the second piston 23 in a state in which the second oil chamber 62 communicates with the first oil chamber 61 and is separated from the third oil chamber 63. In this transmission, hydraulic pressures of the first oil chamber 61 and the second oil chamber 62 communicating with each other are the same as each other. However, as described above, the pressurizing area S2 of the second oil chamber 62 by the second piston 23 is set to be larger than the pressurizing area SI of the first oil chamber 61 by the first piston 12. Therefore, biasing by the first piston 12 is increased according to a ratio S2/S1 between the pressurizing areas of the first oil chamber 61 and the second oil chamber 62 by Pascal's law and transmitted to the second piston 23.

The third oil chamber 63 communicates with the second oil chamber 62 when the second piston 23 is carried rapidly with the output shaft 2 to increase or decrease a capacity of the second oil chamber 62. The third oil chamber 63 has functions as an oil reservoir in which oil flowing from the second oil chamber 62 is stored and as a pump chamber for causing the oil to flow into the second oil chamber 62. Because both the second oil chamber 62 and the third oil chamber 63 are provided within the second cylinder tube, vertically, and in series, a structure is simple and it is possible to make the apparatus compact. It is possible to obtain the same cross-sectional areas of the second oil chamber 62 and the third oil chamber 63 by making the outside diameters of the output shaft tip end portion 24 and the first cylinder tube 26 the same as each other. If the cross-sectional areas are the same, it is possible to make amounts of changes of the capacities of the second oil chamber 62 and the third oil chamber 63 the same as each other and fluid can move smoothly between both the oil chambers.

If the output shaft 2 moves down in a state in which connection of the second oil chamber 62 and the third oil chamber 63 to each other is cancelled, the third oil chamber 63 is biased downward through the second piston 23. This biasing can be absorbed by downward movement of the sub-piston 65 biased upward by the auxiliary spring 64.

The direct-connecting mechanism 4 has an engaging member at an upper portion of the input shaft 1, has an engaged member at an upper portion of the output shaft 2, and directly connects the input shaft 1 and the output shaft 2 by engagement of the members with each other. A biasing member for canceling the engagement acts on the engaging member. A set member for setting the engaging member in a state in which the engaging member can be engaged with the engaged member is disposed at an upper portion of the fixed portion 3. It is also possible that the engaging member is disposed at the output shaft and that the engaged member is disposed at the input shaft.

A lock arm 41 as the engaging member has one end pivoted on the upper portion of the input shaft main body 11 and the other projecting from the center hole 272 formed in the guide plate 27, and is engaged from above with a recessed portion 42 as the engaged member formed at an edge portion of the guide plate center hole 272. The lock arm 41 has a projection 411 at a portion of the lock arm 41 to be engaged with the recessed portion 42. A lock arm spring 43 as abiasing member is disposed at a pivoted portion of the lock arm 41 and biases the lock arm 41 in such a direction that the lock arm 41 moves away from the recessed portion 42.

A lock arm returning roller 44 as the set member is disposed in an downward orientation at the upper plate 34 and pushes the lock arm 41 to a position facing the recessed portion 42 against a biasing force of the lock arm spring 42 when the input shaft 1 is in an uppermost position shown in FIG. 1.

The control mechanism 5 will be described by reference to FIGS. 4 to 7. The control mechanism 5 is provided to the valve body 25 and formed to include first oil paths (first fluid paths) 51 for connecting the first oil chamber 61 and the second oil chamber 62, second oil paths (second fluid paths) 52 for connecting the second oil chamber 62 and the third oil chamber 63, a separating mechanism 53 for separating the first oil paths 51 and canceling the separation, and a closing mechanism 54 for closing the second oil paths 52 and canceling the closing.

The first oil paths 51 are formed of holes formed in the output shaft 2 and connecting an outer peripheral portion side and an inner portion side of the output shaft 2. The second oil paths 52 are formed of holes formed in the second piston 23 and connecting an axial upper face side and an axial lower face side of the second piston 23.

The first oil paths 51 and the second oil paths 52 are formed in a peripheral wall portion 251 of the valve body 25 where the second piston 23 is formed. In the peripheral wall portion 251, a groove 25*a* formed throughout a periphery at an axial intermediate portion of an outer peripheral face of the peripheral wall portion 251, vertical holes 25*b* passing through the peripheral wall portion 251 from an upper face side to a lower face side to intersect the groove 25*a*, and horizontal holes 25*c* respectively extending from the vertical holes 25*b* and communicating with an inner face side of the peripheral portion 25 are formed. An upper peripheral wall portion 251*a* above the groove 25*a* has a small outside diameter and there is a gap B between the upper peripheral wall portion 251 and the second cylinder 32. Each the vertical hole 25*b* is formed of an upper vertical hole 25*b*1 having a large inside diameter and a lower vertical hole 25*b*2 having a small inside diameter and divided into the upper and lower portions at the groove 25*a*. A movable pin 541 as a valve body of the closing mechanism 54 is disposed in each the upper vertical hole 25*b*1.

Each the first oil path 51 is formed by connecting the upper hole 25*b*1 of the vertical hole 25*b* and the horizontal hole 25*c*. Each the second oil path 52 is formed of the lower portion 25*b*2 of the vertical hole 25*b* and communicates with an upper face side of the valve body 25, i.e., the upper face side of the second piston 23 through the groove 25*a* and the gap B. Six (a plurality of) first oil paths 51 and second oil path 52 are respectively provided in the peripheral wall portion 251 of the valve body 25 at predetermined intervals.

The separating mechanism 53 controls fluid connection of the input shaft 1 and the output shaft 2 by controlling opening of the first oil paths 51. The separating mechanism 53 is formed to include a separating member for separating the first oil paths 51 by covering openings 511 on an outer peripheral portion side of the output shaft 2 with the separating member, guide members for guiding actuation of the separating plate 531, and a retaining member for retaining the separating member in a separating position or a canceling position. The separating member is pushed by hydraulic pressure of the first oil chamber 61 to open the first oil path 51 when the hydraulic pressure increases due to biasing of the input shaft 1.

Figure 7:
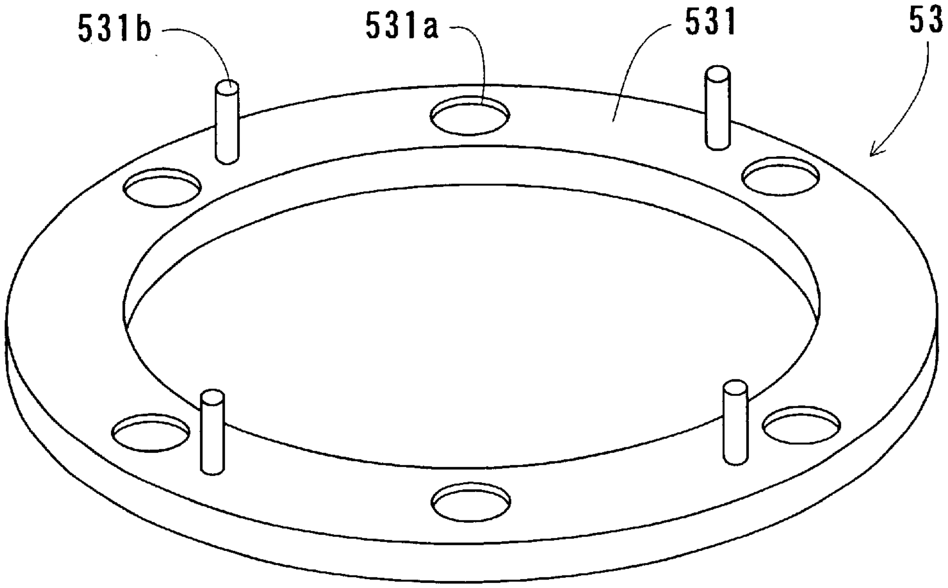
FIG. 7 shows a shape of a separating plate.

The separating plate 531 as the separating member is formed in a ring shape as shown in FIG. 7 and is placed on an upper face side of the peripheral wall portion 251 of the valve body 25 to thereby separate all the plurality of first oil paths 51 opening in the upper face side of the valve body 25 at once. The guide members are formed as six (a plurality of) guide pins 532 to be engaged with six (a plurality of) engaging holes 531*a* formed at predetermined intervals in a peripheral direction of the separating plate 531 so as to guide reciprocation of the separating plate 531 between a separating state and a separation canceling state. Each the guide pin 532 has a base end fixed to an upper face side of the valve body 25 and a tip end provided with a stopper 532*a* for preventing coming off of the separating plate 531. The retaining member is formed of six (a plurality of) first magnets 533 disposed at predetermined intervals on the upper face side 2 of the valve body 25 so as to retain the separating plate 531 in the separating state and second magnets 534 disposed at the tip ends of the guide pins 532 so as to retain the separating plate 531 in the separation canceling state. The separating plate 531 is made of steel and has return pins 531*b* projecting from an upper face side of the separating plate 531. The return pins 531*b* pushed by the intermediate plate 313 when the input shaft 1 is in the uppermost position shown in FIG. 1 to return the separating plate 531 to the separating position.

The closing mechanism 54 is formed to include the movable pins 541 as the valve bodies for canceling connection of the second oil chamber 62 and the third oil chamber 63 to each other, pin guides 542 as guide members for supporting the movable pins 541 for upward and downward movements, and valve seats 543 for supporting the movable pins 541 in closed states. The movable pins 541 function as the valve bodies for controlling opening of the second oil paths 52. In other fords, if the hydraulic pressure of the first oil chamber 61 increases due to biasing of the input shaft 1, each the movable pin 541 is pushed by the hydraulic pressure to come in contact with the valve seat 543 and closes the second oil path 52. If hydraulic pressure of the third oil chamber 63 increases or the hydraulic pressure of the first oil chamber 61 becomes negative pressure, each the movable pin 541 moves upward to open the second oil path 52. Each the pin guide 542 is formed integrally with the vertical hole 25*b* and is provided with a return spring for moving the movable pin 541 upward if necessary. Each the valve seat 543 is formed at a step portion between the upper portion vertical hole 25*b*1 having the large inside diameter and the lower portion vertical hole 25*b*2 having the small inside diameter.

Each the movable pin 541 closes the second oil path 52 at pressure lower than pressure in the first oil chamber 61 when separation of the first oil path 51 by the separating plate is cancelled. In other words, in a process of increase of the hydraulic pressure of the first oil chamber 61, the second oil paths 52 are first closed by the closing mechanism 54 and then separation of the first oil paths 51 by the separating mechanism 53 is cancelled. This can be achieved by setting forces of the first magnets 533 for retaining the separating plate 531 at greater values than movement resistance in closing the movable pin 541.

As described above, because the control mechanism 5 is actuated exclusively by hydraulic pressure, it is unnecessary to especially provide an actuator as a drive source and a sensor and the like for controlling the actuator. Therefore, it is possible to dispose the large number of oil paths in limited space such as the peripheral wall portion of the valve body and oil can be moved swiftly between the respective oil chambers, which of course contributes to provision of the low-cost and less trouble-prone pressurizing apparatus with a simple structure.

The hydraulic mechanism 6 is formed to include the first piston 12 formed in the input shaft 1, the first oil chamber 61 biased by the first piston 12, the second oil chamber 62 communicating with the first oil chamber 61 to transmit biasing transmitted from the first oil chamber 61 to the second piston 23, and the second piston formed in the output shaft 2. As described already, because the pressurizing area of the second piston 23 is set to be larger than the pressurizing area of the first piston 12, biasing by the first piston 12 is increased according to the ratio between the pressurizing areas of the first oil chamber 61 and the second oil chamber 62 by Pascal's law and transmitted to the second piston 23. Therefore, it is possible to apply high thrust to the output shaft.

Here, actuation of the pressurizing apparatus according to the embodiment will be described in detail. FIG. 1 shows an initial state of this pressurizing apparatus. In this state, an actuating signal is transmitted and the servomotor (not shown) rotates to normally rotate the ball screw 72 through a speed reducing mechanism (not shown). If the ball screw 72 is rotated normally, the nut 71 mounted to the ball screw 72 acts directly and downward. Because the input shaft 1 is directly connected to the nut 71, the input shaft 1 moves down with the nut 71. The input shaft 1 moves in such a direction as to bias the projection 411 of the lock arm 41 disposed on the input shaft 1 toward the recessed portion 42 formed in the output shaft 2. Therefore, though the lock arm spring 43 biases in such a direction as to cancel engagement of the lock arm 41, direct connection of the input shaft 1 and the output shaft 2 to each other is maintained and the output shaft 2 moves down with the input shaft 1. Therefore, if a speed reducing ratio in transmitting rotation from the servomotor to the ball screw 72 is set at a small value, the output shaft 2 can be carried rapidly with low thrust but at a high speed. Until the projection 411 of the lock arm 41 disposed on the input shaft 1 is reliably engaged with the recessed portion 42 formed in the output shaft 2, the lock arm returning roller 44 maintains the lock arm 41 in a predetermined orientation against the lock arm spring 43. As the output shaft 2 moves downward, the valve body 25 provided to an intermediate portion of the output shaft 2, i.e., the second piston 23 moves downward, the second oil chamber 62 is expanded, and the third oil chamber 63 is contracted. However, because the second oil chamber 62 and the third oil chamber 63 communicate with each other through the second oil paths 52, oil moves from the third oil chamber 63 to the second oil chamber 62 without large resistance and high-speed movement of the output shaft 2 is not hindered.

If the rapid carrying of the output shaft 2 is finished as shown in FIG. 2, the servomotor is stopped temporarily.

Then, if the biasing force from the input shaft 1 to the output shaft 2 is attenuated and the force of the lock arm 41 for pushing the projection 411 against the recessed portion 42 is attenuated, engagement by the lock arm 41 is cancelled by the lock arm spring 43. Thus, the input shaft 1 is separated from the output shaft 2 and can move down independently.

If the input shaft 1 moves down independently as shown in FIG. 3, the first piston 12 biases the first oil chamber 61 and hydraulic pressure of the first oil chamber 61 increases due to this biasing. Because the separating plate 531 is attracted by the first magnets 533, the movable pins 541 with small movement resistance are first moved by biasing of the hydraulic pressure of the first oil chamber 61 in such a direction as to close the second oil paths 52. When the movable pins 541 come in contact with the valve seats 543 and cannot move any more, the hydraulic pressure of the first oil chamber 61 further increases, a biasing force due to the hydraulic pressure exceeds attracting forces of the first magnets 533, and separation of the first oil paths 51 by the separating plate 521 is cancelled. The separating plate 531 is pushed by biasing until the plate 531 comes in contact with the stoppers 532*a* of the guide pins 532 and is attracted by the second magnets 524 to maintain a state in which separation of the first oil chamber 61 and the second oil chamber 62 from each other is cancelled. Thus, biasing of the first oil chamber 61 by the first piston 12 is transmitted from the second oil chamber 62 through the first oil paths 51 to the second piston 23. Because the pressurizing area of the second oil chamber 62 is set to be larger than the pressurizing area of the first oil chamber 61, biasing by the first piston 12 is increased and transmitted to the second piston 23. Therefore, the output shaft 2 having the second piston 23 is pressurized with high thrust. Although the third oil chamber 62 is biased downward by movement of the output shaft 2 due to this pressurization, an amount of movement due to this biasing is absorbed by downward movement of the sub-piston 65 supported by the auxiliary spring 64.

When a pressurizing step is finished and the servomotor stops temporarily, the sub-piston 65 is pushed by the auxiliary spring 64 and a biasing force generated by the sub-piston 65 which tries to return to an original position acts in such a direction as to cancel closing of the movable pins 541. If the servomotor starts rotating reversely and the output shaft 2 is biased upward, pressures in the first oil chamber 61 and the second oil chamber 62 become negative pressures. As a result, the movable pins 541 are returned to positions in an initial state and the second oil chamber 62 and the third oil chamber 63 communicate with each other. Even if the first shaft 1 moves up until the upper end of the input shaft 1 comes in contact with the guide plate 27 of the output shaft 2 and the output shaft 2 starts moving upward, large resistance is not generated because the second oil chamber 62 and the third oil chamber 63 are connected. If the output shaft 2 further moves upward, the lock arm spring 43 is returned by the lock arm returning roller 44 to a position in the initial state. The return pins 531*b* provided to the upper face of the separating plate 531 come in contact with the intermediate plate 313 and the separating plate 531 is returned to the initial separating state. Thus, operation of the present pressurizing apparatus is completed.

INDUSTRIAL APPLICABILITY

As described above, the present invention relates to a pressurizing apparatus used for pressurization of a metal mold in sheet-metal presswork and the like and clamping of a metal mold in die casting, injection molding, and the like and can provide a low-cost pressurizing apparatus with high productivity by combining a direct-connecting mechanism for moving an output shaft with low thrust and at a high speed and a fluid pressure mechanism for driving the output shaft at a low speed and with high thrust with each other.

What is claimed is:

1. A pressurizing apparatus comprising a fixed portion, an input shaft for acting directly in an axial direction with respect to the fixed portion, an output shaft extending coaxially with the input shaft to slide with respect to said fixed portion and said input shaft, a direct-connecting mechanism for directly connecting the output shaft and said input shaft and for causing said input shaft to directly act with respect to the fixed portion to thereby rapidly carry said output shaft with respect to the fixed portion, a fluid pressure mechanism for connecting said input shaft and said output shaft in a fluid manner and for causing said input shaft to directly act with respect to said output shaft to thereby increase biasing of said input shaft by Pascal's law and transmit the biasing to said output shaft, and a control mechanism actuated by biasing applied by said input shaft to control fluid connection of said input shaft and said output shaft to each other.

2. The pressurizing apparatus according to claim 1, wherein said input shaft is caused to act directly by a servomotor in the axial direction with respect to said fixed portion through a rotation/direct-action converting mechanism.

3. The pressurizing apparatus according to claim 2, wherein said rotation/direct-action converting mechanism is a ball screw-nut mechanism and has a ball screw supported for rotation by said fixed portion and a nut fixed to said input shaft.

4. The pressurizing apparatus according to claim 1, wherein said fluid pressure mechanism includes a first fluid chamber biased by said input shaft by causing said input shaft to directly act with respect to said output shaft and a second fluid chamber having a larger pressurizing area than the first fluid chamber to bias said output shaft and said control mechanism opens a first fluid path between said first fluid chamber and said second fluid chamber to connect said input shaft and said output shaft in a fluid manner.

5. The pressurizing apparatus according to claim 4, wherein said control mechanism includes a separating mechanism disposed in said first fluid path to separate said first fluid path and to cancel said separation by pressure in said first fluid chamber increased by biasing applied by said input shaft.

6. The pressurizing apparatus according to claim 5, wherein said second fluid chamber has a second fluid path communicating with a third fluid chamber provided separately from said first fluid chamber and the second fluid path is open while rapid carrying by said direct-connecting mechanism is carried out and is closed by a closing mechanism actuated by said pressure of said first fluid chamber increased by said biasing by said input shaft after direct connection by said direct-connecting mechanism is cancelled.

7. The pressurizing apparatus according to claim 6 wherein said closing mechanism closes said second fluid path at pressure lower than pressure at which said separation by said separating mechanism is cancelled.

8. The pressurizing apparatus according to claim 7, wherein magnets for retaining a separating member in respective positions corresponding to a separating state and a separation canceling state of said first fluid path are disposed in said control mechanism in said separating mechanism.

9. The pressurizing apparatus according to claim 4, wherein said first fluid chamber is defined by an outer peripheral portion of said input shaft, a first piston provided to the outer peripheral portion, and a first cylinder formed inside said output shaft, said second fluid chamber and said third fluid chamber are defined by an outer peripheral portion of said output shaft, a second piston provided to an axial intermediate portion of the outer peripheral portion, and a second cylinder formed inside said fixed portion and are disposed on opposite sides of the second piston in an axial direction of said output shaft.

10. The pressurizing apparatus according to claim 9, wherein said third fluid chamber has a sub-piston moved by biasing by said output shaft to absorb said biasing of said output shaft.

11. The pressurizing apparatus according to claim 9, wherein said first fluid path is formed of a passage hole formed in said output shaft and connecting an outer peripheral side and an inner side of said output shaft and said second fluid path is formed of a passage hole formed in said second piston and connecting axial opposite outer faces of said second piston.

12. The pressurizing mechanism according to claim 1, wherein said direct-connecting mechanism is formed by disposing an engaging member in one of said input shaft and said output shaft and disposing an engaged member in the other, direct connection of said input shaft and said output shaft to each other by said engaging member and said engaged member is maintained by biasing of said output shaft by said input shaft, and said direct connection of said input shaft and said output shaft to each other is cancelled when said biasing of said output shaft by said input shaft is attenuated.

* * * * *